United States Patent
Newbound et al.

(10) Patent No.: US 9,694,742 B2
(45) Date of Patent: Jul. 4, 2017

(54) VEHICLE PANEL ASSEMBLY INCLUDING A GESTURE ACTIVATED VEHICLE LIGHTING SYSTEM

(71) Applicant: Nissan North America, Inc., Franklin, TN (US)

(72) Inventors: Constance Newbound, Saline, MI (US); Nelson Phan, Rochester Hills, MI (US); William Weber, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 219 days.

(21) Appl. No.: 14/668,548

(22) Filed: Mar. 25, 2015

(65) Prior Publication Data
US 2016/0280129 A1    Sep. 29, 2016

(51) Int. Cl.
| | |
|---|---|
| B60Q 1/00 | (2006.01) |
| F21V 21/28 | (2006.01) |
| F21V 21/29 | (2006.01) |
| B60Q 3/02 | (2006.01) |
| B60R 13/02 | (2006.01) |

(Continued)

(52) U.S. Cl.
CPC .......... *B60Q 3/0293* (2013.01); *B60Q 3/217* (2017.02); *B60Q 3/225* (2017.02); *B60Q 3/51* (2017.02); *B60Q 3/80* (2017.02); *B60R 7/046* (2013.01); *B60R 13/0237* (2013.01); *B60R 2013/0287* (2013.01)

(58) Field of Classification Search
CPC .. B60Q 3/0293; B60Q 3/0203; B60Q 3/0216; B60Q 3/022; B60Q 3/51; B60Q 3/217; B60Q 3/225; B60Q 3/80; B60R 7/046; B60R 13/0237; B60R 2013/0287
USPC .................................... 362/464, 488; 315/77
See application file for complete search history.

(56) References Cited

U.S. PATENT DOCUMENTS 4,959,637 A * 9/1990 Woods ............... G08B 21/0415
340/321
6,139,088 A * 10/2000 Okamoto ............... B60J 5/0416
296/146.1

(Continued)

FOREIGN PATENT DOCUMENTS

| | | |
|---|---|---|
| JP | 2005-019155 A | 1/2005 |
| JP | 2007-314073 A | 12/2007 |

(Continued)

OTHER PUBLICATIONS

Machine English Translation of JP 2007314073 to Tanaka, Shigehisa; Dec. 2007.*

(Continued)

*Primary Examiner* — Anh Mai
*Assistant Examiner* — Glenn Zimmerman
(74) *Attorney, Agent, or Firm* — Global IP Counselors, LLP

(57) ABSTRACT

A vehicle panel assembly comprises a trim assembly, a light and a sensor. The trim assembly defines a recessed storage area. The light is disposed on the trim assembly and configured to emit visible light toward the recessed storage area. The sensor is disposed on the trim assembly proximate to the recessed storage area and configured to activate the light to emit the visible light upon the sensor sensing a presence of an object entering an area proximate to the sensor that includes the recessed storage area.

20 Claims, 5 Drawing Sheets

(51) Int. Cl.
  *B60R 7/04*    (2006.01)
  *B60Q 3/51*    (2017.01)
  *B60Q 3/217*   (2017.01)
  *B60Q 3/225*   (2017.01)
  *B60Q 3/80*    (2017.01)

(56) References Cited

U.S. PATENT DOCUMENTS

| | | | |
|---|---|---|---|
| 7,665,869 B2 | 2/2010 | Spazier | |
| 8,029,052 B2 | 10/2011 | Kadzban et al. | |
| 8,840,288 B2 | 9/2014 | Plavetich et al. | |
| 2005/0213317 A1* | 9/2005 | Lui | F21V 23/0414 362/157 |
| 2010/0212819 A1* | 8/2010 | Salter | B60Q 3/0279 156/221 |
| 2010/0296304 A1* | 11/2010 | Hayes | B60Q 3/022 362/488 |
| 2012/0048708 A1 | 3/2012 | Salter et al. | |
| 2015/0274069 A1* | 10/2015 | Cuddihy | B60Q 3/022 315/77 |
| 2016/0107566 A1* | 4/2016 | Gasahl, IV | G02B 6/001 362/581 |

FOREIGN PATENT DOCUMENTS

| | | |
|---|---|---|
| JP | 2007-331648 A | 12/2007 |
| JP | 2007314073 A * | 12/2007 |
| JP | 2014-227018 A | 12/2014 |

OTHER PUBLICATIONS

International Search Report in PCT/JP2016/058956 dated Jun. 14, 2016.

\* cited by examiner

VEHICLE PANEL ASSEMBLY INCLUDING A GESTURE ACTIVATED VEHICLE LIGHTING SYSTEM

BACKGROUND

Field of the Invention

The present invention generally relates to a vehicle panel assembly including a gesture activated vehicle lighting system. More specifically, the present invention relates to a vehicle panel assembly including a system that operates to emit visible light toward a recessed storage area in a vehicle trim panel upon sensing a presence of an object becoming proximate to the recessed storage area.

Background Information

Most vehicles today include lighting arrangements for illuminating various areas of the vehicle passenger compartment. For example, a vehicle can include one or more dome lights for illuminating the vehicle passenger compartment in general, as well other lights such as reading lights, visor lights, a glove compartment light, a trunk or hatch light, door lights and so on for illuminating specific areas. Typically, these lights can be selectively activated by operating a switch or by performing other activity relating to the vehicle such as opening a vehicle door, opening the glove compartment, opening the trunk or hatch, and so on.

SUMMARY

In view of the state of the known technology, it is desirable to activate a vehicle light simply by performing a gesture. For example, it is desirable for a light associated with a recessed storage compartment in a vehicle trim panel, such as a vehicle door panel, to automatically become activated when a person in the vehicle attempts to remove an object in the storage compartment or place an object into the storage compartment so that the storage compartment becomes illuminated and thus easier to see. Accordingly, one aspect of the present invention provides a vehicle panel assembly that comprises a trim assembly, a light and a sensor. The trim assembly defines a recessed storage area. The light is disposed on the trim assembly and configured to emit visible light toward the recessed storage area. The sensor is disposed on the trim assembly proximate to the recessed storage area and configured to activate the light to emit the visible light upon the sensor sensing a presence of an object entering an area proximate to the sensor that includes the recessed storage area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Figure 1:
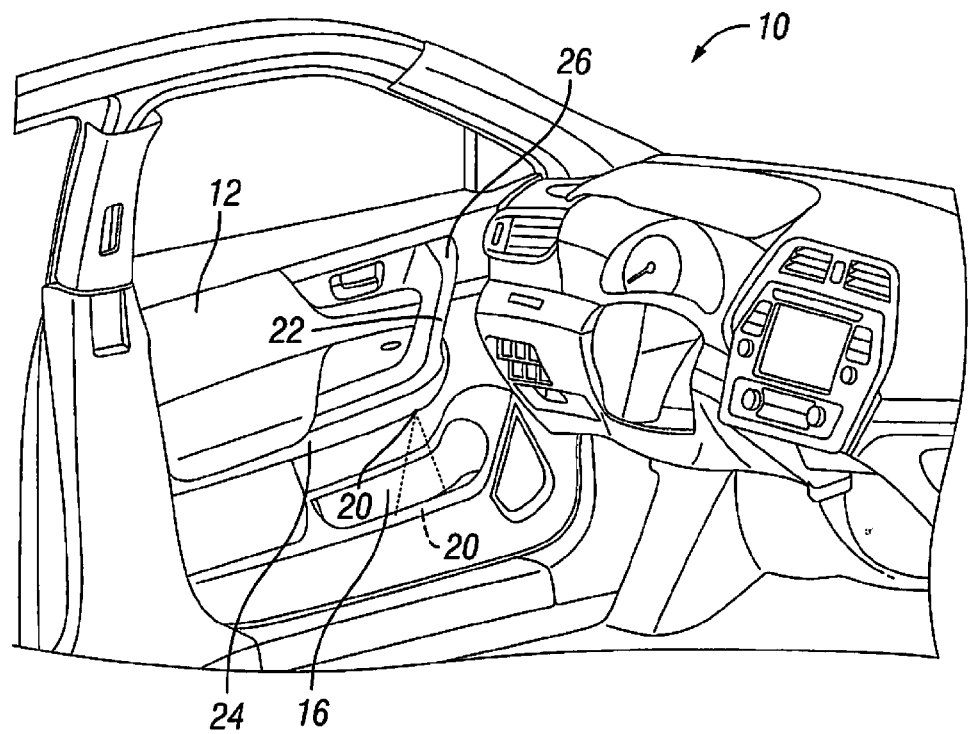
FIG. 1 illustrates an example of a portion of a vehicle compartment and a vehicle panel assembly configured as a vehicle door including a gesture activated vehicle lighting system according to a disclosed embodiment.
Figure 2:
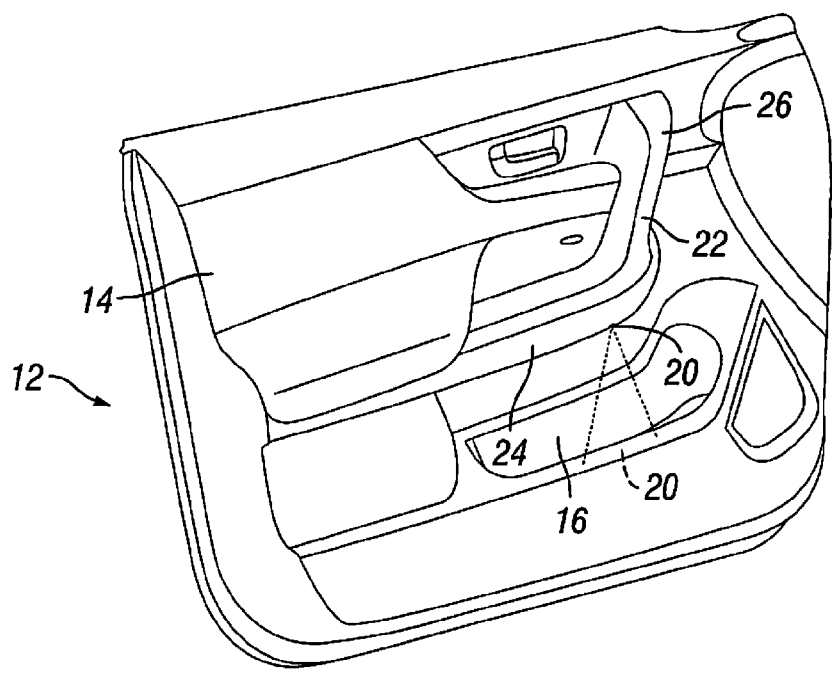
FIG. 2 is an enlarged view of the vehicle door shown in FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1 through 5 illustrate a vehicle 10, such as an automobile, van, truck, SUV or any other type of vehicle, and a vehicle panel assembly 12 which, in this example, is configured as a door of the vehicle 10. In particular, the vehicle panel assembly 12 in this example is configured as a vehicle door on the driver side of the vehicle 10. However, as will be appreciated from the following description, a respective vehicle panel assembly 12 can be configured as any or each of the vehicle doors, or as any other suitable vehicle panel such as an interior sidewall panel, a center console, a rear console, a dashboard, an exterior vehicle panel, and at any other suitable vehicle trim member on the vehicle 10.

As further indicated, the vehicle panel assembly 12 includes a trim assembly 14 defining a recessed storage area 16. In this example, the trim assembly 14 is configured as a vehicle door trim assembly 14 defining the recessed storage area 16 in the vehicle door trim assembly 14. For instance, the recess storage area 16 can be configured as a storage pocket in the vehicle door. The vehicle panel assembly 12 further includes at least one light 18 that is disposed on the trim assembly 14 and configured to emit visible light toward the recessed storage area 16, and a sensor 20 disposed on the trim assembly 14 proximate to the recessed storage area 16.

The light 18 can be, for example, a light emitting diode (LED) or any other suitable type of light as known in the art. The light 18 includes a light emitting surface 18D, and the light 18 is disposed proximate to the recessed storage area 16 with the light emitting surface 18D facing the recessed storage area 16. The sensor 20 in this example can include a proximity sensor, such as an infrared sensor or any other suitable type of touchless sensor, which is configured to sense the presence of the object without the object contacting the sensor 20. Alternatively or in addition, the sensor 20 can include a touch sensor, such as a capacitive touch sensor or any other suitable type of contact sensor, which is configured to sense the presence of the object in the area proximate to the sensor 20 upon the object contacting the sensor 20.

In this example, the light 18 and the sensor 20 are disposed apart from each other and vertically above the recessed storage area 16, and the sensor 20 is disposed closer to the recessed storage area 16 than the light 18. However, the light 18 and sensor 20 can be disposed in any suitable locations in order to achieve the operations described herein. That is, as discussed in detail below, the sensor 20 is configured to activate the light 18 upon the sensor 20 sensing a presence of an object entering an area proximate to the sensor 20 that includes the recessed storage area 16.

The vehicle door trim assembly 14 includes a door handle portion 22 positioned vertically above the recessed storage area 16. The light 18 is disposed between the door handle portion 22 and the recessed storage area 16. The door handle portion 22 includes a lower end 24 and an upper distal end 26. In the example shown in FIGS. 1, 2 and 6, the light 18 is disposed proximate to the upper distal end 26 and the recessed storage area 16 is spaced below and apart from the lower end 24. Alternatively, in the example shown in FIG. 7, the light 18 is disposed proximate to the lower end 24 of the door handle portion 22 and the recessed storage area 16 is spaced below and apart from the lower end 24. Naturally, more than one light 18 can be positioned at both positions or at any other suitable position to illuminate the recessed storage area 16.

Figure 3:
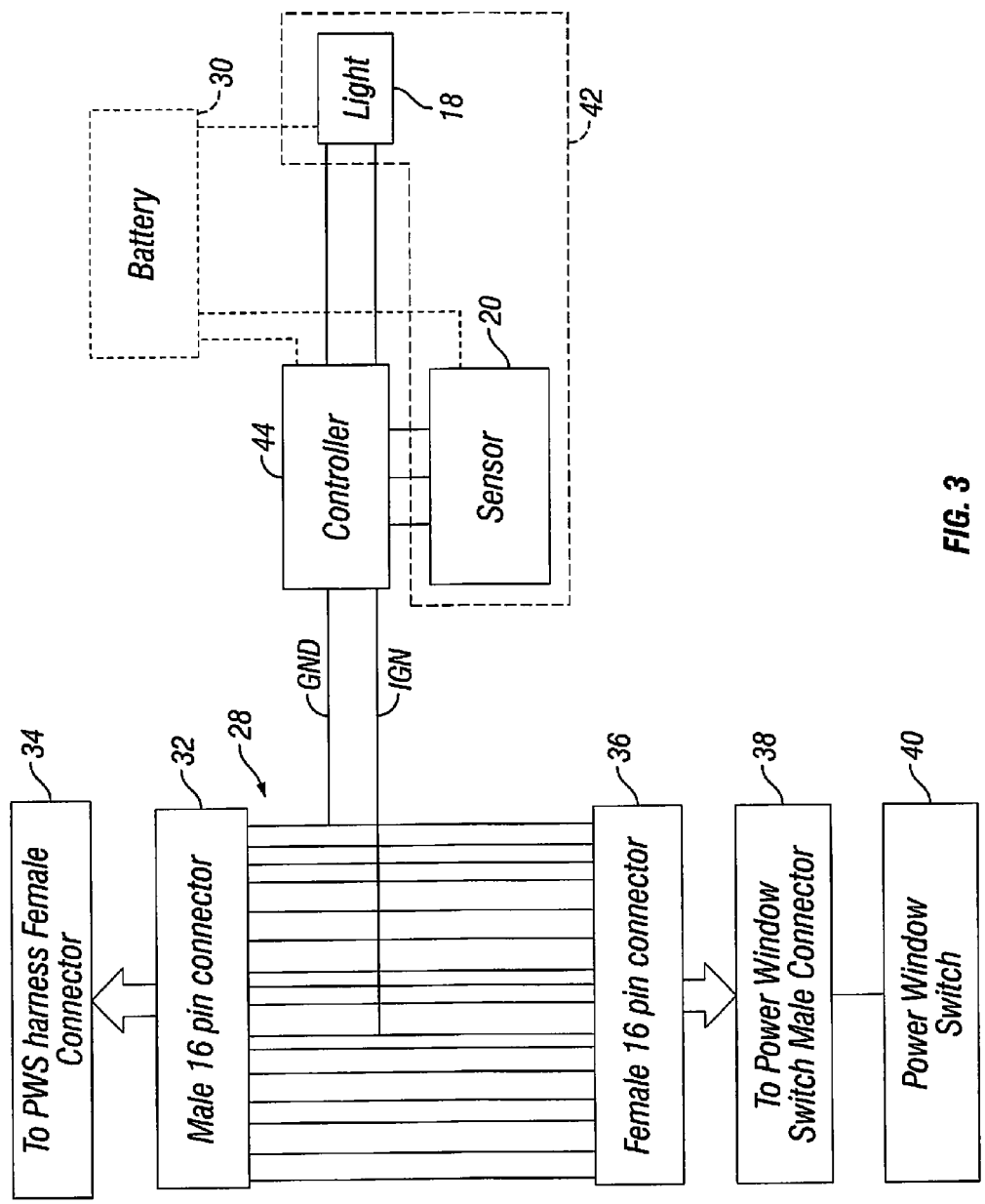
FIG. 3 is a block diagram illustrating an example of components of the gesture activated vehicle lighting system according to a disclosed embodiment.

As shown in the block diagram of FIG. 3, the light 18 and the sensor 20 can be electrically coupled to, for example, a wiring harness 28 that is disposed in the vehicle door trim assembly 14. As indicated, the light 18 and the sensor 20 can be electrically connected to the ground wire GND and the ignition voltage wire IGN that supplies power when the ignition of the vehicle 10 is turned on. Alternatively or in addition, the light 18, the sensor 20, or both, can be electrically coupled to a battery 30 which is independent of a power system of the vehicle 10.

Figure 4:
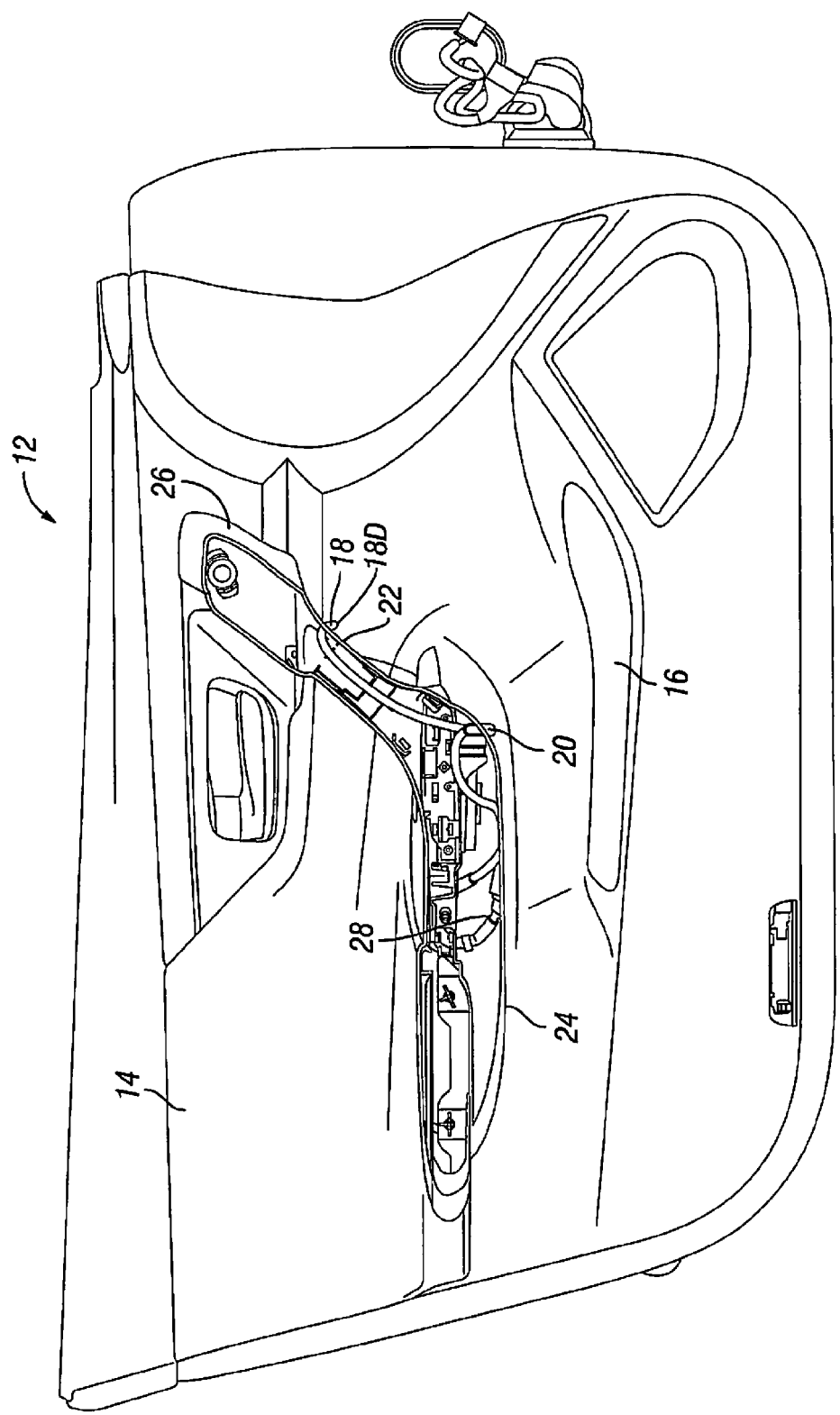
FIG. 4 is a breakout view of the vehicle door illustrating an example of a mounting and wiring arrangement of the gesture activated vehicle lighting system.
Figure 5:
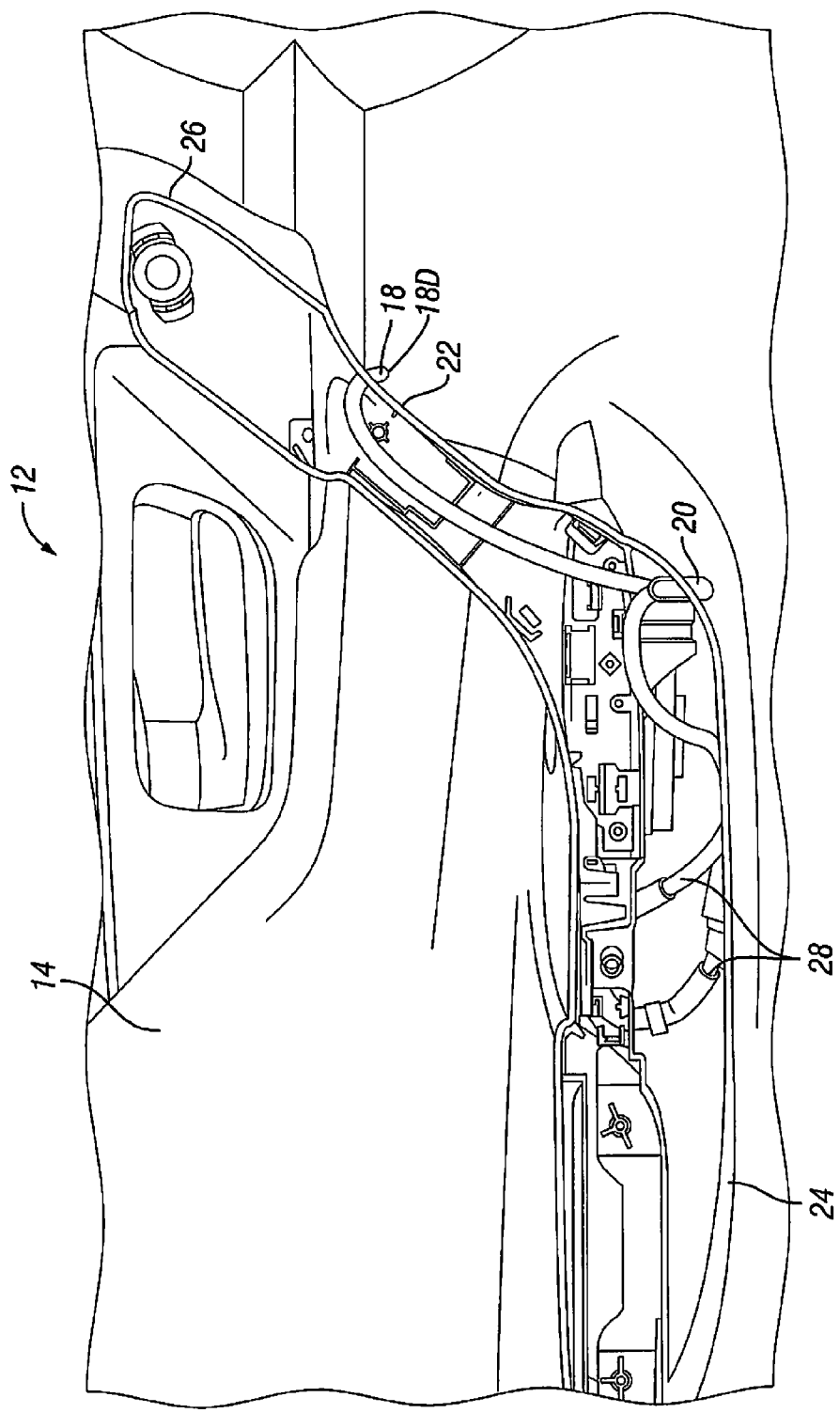
FIG. 5 is an enlarged breakout view of the vehicle door as shown in FIG. 4.

The wiring harness 28 can be any suitable type of harness having, for example, a male connector 32 and a female connector 36. In this example, the male connector 32 of the wiring harness 28 can mate with the female connector 34 of a power harness (e.g., a power window switch [PWS] harness, not shown) and the female connector 36 of the wiring harness 28 can be connected to the male connector 38 of the power window switch 40 in the vehicle door trim assembly 14. Thus, the wiring harness 28 can provide power from the power harness to the power window switch 40, and the light 18 and the sensor 20 can tap into power delivered by the wiring harness 28 in the event that a dedicated wiring harness is not provided for the light 18 and the sensor 20, as can be appreciated by one skilled in the art. FIGS. 4 and 5 illustrate an example of the location of the light 18, the sensor 20, the wiring harness 28 and the power window switch 40 in the vehicle door trim assembly 14. Naturally, these and other components can be positioned in the vehicle door trim assembly 14 in any suitable manner in order to achieve the operations discussed herein. Furthermore, the sensor 20 and the light 18 can be configured as a sensor and light assembly 42 that comprises the sensor 20 and the light 18 together in a common housing.

In addition, a controller 44 can be electrically coupled to the light 18 and the sensor 20, and can receive power from the wiring harness 28 via connections to the ignition voltage wire IGN and ground GND as shown. The controller 44 preferably includes a microcomputer with a control program that controls the light 18 and the sensor 20 as discussed herein. The controller 44 can also include other conventional components such as an input interface circuit, an output interface circuit, and storage devices such as a ROM (Read Only Memory) device and a RAM (Random Access Memory) device. The RAM and ROM store processing results and control programs that are run by the controller 44. The controller 44 is operatively coupled to the light 18 and the sensor 20, and to the components of the vehicle 10 as appropriate, in a conventional manner. It will be apparent to those skilled in the art from this disclosure that the precise structure and algorithms for the controller 44 can be any combination of hardware and software that will carry out the functions of the present invention. As with the light 18 and the sensor 20, the controller 44 can also be powered by the battery 30 or another battery (not shown) as desired. For purposes of the description herein, the term "sensor" can be used to refer to the combination of the sensor 20 and the controller 44 in terms of the manner in which the light 18 is controlled.

Figure 6:
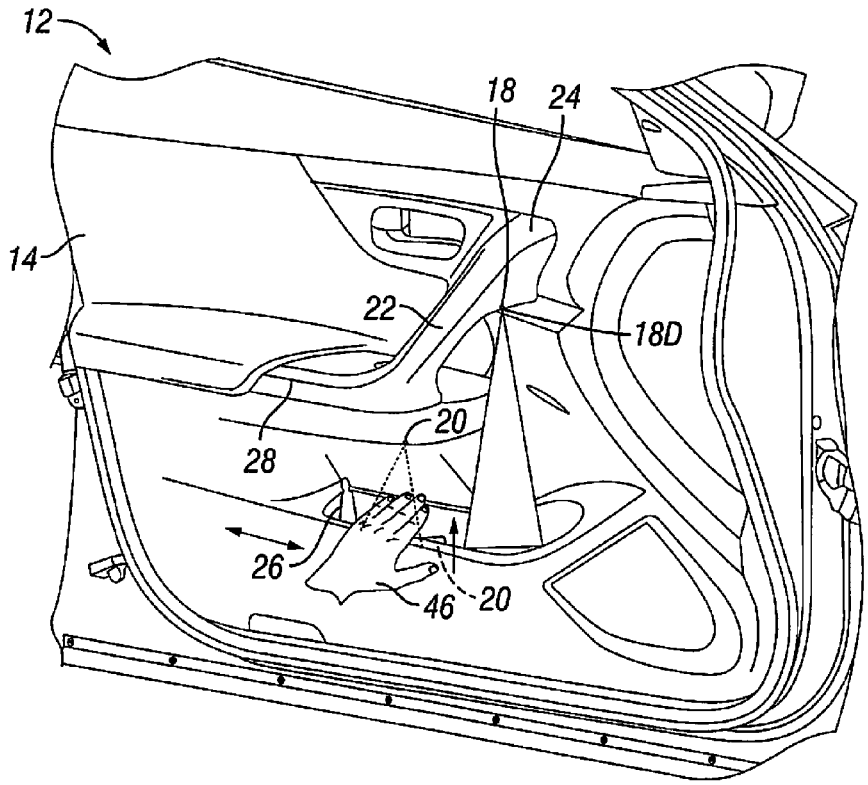
FIG. 6 illustrates an example of an operation of one embodiment of the gesture activated vehicle lighting system.
Figure 7:
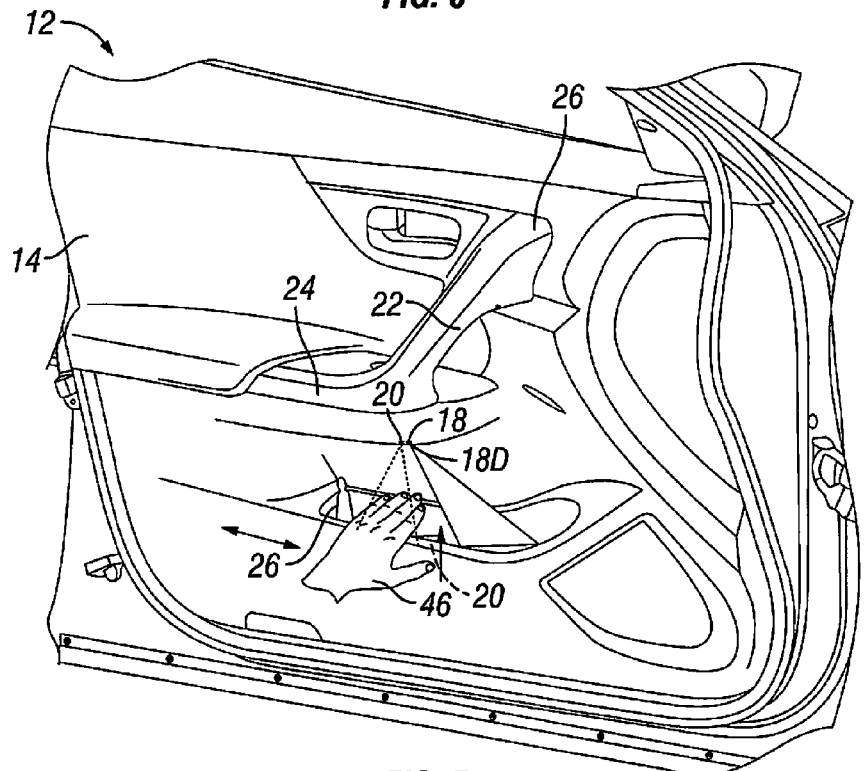
FIG. 7 illustrates an example of an operation of another embodiment of the gesture activated vehicle lighting system.

Examples of the operation of the light 18 and sensor 20 are illustrated in FIGS. 6 and 7. In the example shown in FIG. 6, the light 18 and the sensor 20 are disposed apart from each other. In the example shown in FIG. 7, the light 18 and the sensor 20 are disposed proximate to each other, such as on the sensor and light assembly 42. As indicated in both examples, the sensor 20 operates to sense when an object 46, such as a hand of an occupant of the vehicle 10, begins entering an area proximate to the sensor 20 that includes the recessed storage area 16. Upon receiving a signal from the sensor 20 indicating that the object 46 is entering the area, the controller 44 can activate the light 18 to illuminate the recessed storage area 16. The controller 44 can be configured to maintain the light 18 activated as long as the sensor 20 continues to sense the presence of the object 46 in the area.

The controller 44 can be further configured to automatically deactivate the light 18 at a predetermined period of time after activating the light. For instance, when the sensor 20 no longer senses the presence of the object 46 in the area, the controller 44 can automatically deactivate the light 18 after a predetermined period of time has elapsed beginning at the time that the sensor 20 no longer senses the presence of the object 46. Alternatively or in addition, the controller 44 can be configured to deactivate the light 18 upon the sensor 20 sensing the presence of the object 46 entering the area proximate to the sensor 20 while the sensor 20 is already activating the light 18. For instance, the controller 44 can activate the light 18 upon receiving an indication from the sensor 20 that the object 46 has been sensed, and then the controller 44 can maintain the light 18 in an active state even if the sensor 20 no longer senses the object 46. However, if the sensor 20 then again senses the object 46 while the light 18 is in an active state, the controller 44 can deactivate the light 18. This operation therefore allows a user to activate the light 18 with a gesture and then deactivate the light 18 with another gesture. The controller 44 can also deactivate the light 18 after a predetermined period of time even if no additional gesture is made, that is, the sensor 20 does not sense the object 46 while the light 18 is activated.

In addition, the light 18 can be configured as a type of light that can emit the visible light at different intensities. Thus, the controller 44 can be further configured to control the light 18 to change an intensity at which the light 18 is emitting the visible light upon the sensor 20 sensing the presence of the object 46 entering the area proximate to the sensor 20 while the controller 44 is activating the light 18. Accordingly, the user can change the intensity of the light 18 by making multiple gestures.

As can further be appreciated by one skilled in the art, the controller 44 can be configured to disable the light 18 under certain operating conditions of the vehicle 10. For instance, if the vehicle door trim assembly 14 is configured as a driver side vehicle door trim assembly, the controller 44 can maintain the light 18 in a deactivated state until the vehicle 10 is travelling below a predetermined speed or the vehicle transmission is in park. The controller 44 can also maintain the light 18 in a deactivated state when a sensor (not shown)

in the vehicle 10 indicates to the controller 44 that there is a sufficient amount of ambient light in the passenger compartment of the vehicle 10.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle panel assembly comprising:
a trim assembly defining a recessed storage area;
a light disposed on the trim assembly and configured to emit visible light toward the recessed storage area; and
a sensor disposed on the trim assembly proximate to the recessed storage area and configured to activate the light to emit the visible light upon the sensor sensing a presence of an object entering an area proximate to the sensor that includes the recessed storage area; and
at least one of the light and the sensor are electrically coupled to a power window switch in the vehicle door trim assembly.

2. The vehicle panel assembly according to claim 1, wherein
the light includes a light emitting surface, and the light is disposed proximate to the recessed storage area with the light emitting surface facing the recessed storage area.

3. The vehicle panel assembly according to claim 1, wherein
the trim assembly is configured as a vehicle door trim assembly defining the recessed storage area in the vehicle door trim assembly.

4. The vehicle panel assembly according to claim 1, wherein
the sensor and the light are disposed apart from each other.

5. The vehicle panel assembly according to claim 1, further comprising
a sensor and light assembly that comprises the sensor and light in a common housing.

6. The vehicle panel assembly according to claim 1, wherein
the sensor includes a proximity sensor configured to sense the presence of the object without the object contacting the sensor.

7. The vehicle panel assembly according to claim 1, wherein
the sensor includes a touch sensor configured to sense the presence of the object in the area proximate to the sensor upon the object contacting the sensor.

8. The vehicle panel assembly according to claim 1, wherein
the sensor includes a capacitive touch sensor.

9. The vehicle panel assembly according to claim 1, wherein
the sensor is further configured to automatically deactivate the light at a predetermined period of time after activating the light.

10. The vehicle panel assembly according to claim 1, wherein
the sensor is further configured to deactivate the light upon the sensor sensing the presence of an object entering the area proximate to the sensor while the sensor is activating the light.

11. The vehicle panel assembly according to claim 1, wherein
the light is configured to emit the visible light at different intensities; and
the sensor is further configured to control the light to change an intensity at which the light is emitting the visible light upon the sensor sensing the presence of an object entering the area proximate to the sensor while the sensor is activating the light.

12. The vehicle panel assembly according to claim 3, wherein
the vehicle door trim assembly includes a door handle portion positioned vertically above the recessed storage area, and the light is disposed between the door handle portion and the recessed storage area.

13. The vehicle panel assembly according to claim 3, wherein
the light and the sensor are disposed vertically above the recessed storage area.

14. The vehicle panel assembly according to claim 3, wherein
at least one of the light and the sensor are electrically coupled to a battery which is independent of a power system of the vehicle.

15. The vehicle panel assembly according to claim 3, wherein the vehicle door trim assembly is configured as a driver side vehicle door trim assembly.

16. The vehicle panel assembly according to claim 6, wherein the proximity sensor includes an infrared sensor.

17. The vehicle panel assembly according to claim 12, wherein the door handle portion includes a lower end and an upper distal end, the light is disposed proximate to the upper distal end and the recessed storage area is spaced below and apart from the lower end.

18. The vehicle panel assembly according to claim 12, wherein the door handle portion includes a lower end and an upper distal end, the light is disposed proximate to the lower end and the recessed storage area is spaced below and apart from the lower end.

19. The vehicle panel assembly according to claim 13, wherein the sensor is disposed closer to the recessed storage area than the light.

20. A vehicle panel assembly comprising:

a vehicle door trim assembly defining a recessed storage area and including a door handle portion positioned vertically above the recessed storage area, the door handle portion including a lower end and an upper distal end, and the recessed storage area is spaced below and apart from the lower end;

a light disposed at the upper distal end of the door handle portion and configured to emit visible light toward the recessed storage area; and a sensor disposed on the trim assembly proximate to the recessed storage area and configured to activate the light to emit the visible light upon the sensor sensing a presence of an object entering an area proximate to the sensor that includes the recessed storage area.

\* \* \* \* \*